US012731518B2

(12) United States Patent
He et al.

(10) Patent No.: US 12,731,518 B2
(45) Date of Patent: Sep. 8, 2026

(54) HALO TEST METHOD AND HALO TEST DEVICE

(71) Applicant: HKC CORPORATION LIMITED, Shenzhen (CN)

(72) Inventors: Yang He, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 208 days.

(21) Appl. No.: 18/668,564

(22) Filed: May 20, 2024

(65) Prior Publication Data

US 2025/0014492 A1 Jan. 9, 2025

(30) Foreign Application Priority Data

Jul. 4, 2023 (CN) ......................... 202310811603.9

(51) Int. Cl.

| | |
|---|---|
| ***G09G 3/20*** | (2006.01) |
| ***G09G 5/02*** | (2006.01) |
| ***H04N 1/60*** | (2006.01) |

(52) U.S. Cl.

CPC ... *G09G 3/2003* (2013.01); *G09G 2320/0233* (2013.01); *G09G 2320/029* (2013.01); *G09G 2360/16* (2013.01)

(58) Field of Classification Search

CPC ................ G09G 3/2003; G09G 3/342; G09G 5/02–5/10; G09G 2320/029–0233; G09G 2320/0271; G09G 2320/0276; G09G 2360/16; G09G 3/2088; G09G 3/283; G09G 3/288; G09G 3/36; G09G 5/227; G09G 5/30; G09G 5/32; G09G 5/42; G09G 2320/00; G09G 2320/02; G09G 2320/0209; G09G 2320/0238; H04N 1/58–60;

(Continued)

(56) References Cited

U.S. PATENT DOCUMENTS

| | | | | |
|---|---|---|---|---|
| 11,240,439 | B2 * | 2/2022 | Mizutani | G06V 10/10 |
| 2013/0322753 | A1 * | 12/2013 | Lim | G06T 5/70 382/167 |
| 2020/0204716 | A1 * | 6/2020 | Mizutani | G06V 10/10 |

FOREIGN PATENT DOCUMENTS

| | | |
|---|---|---|
| CN | 113870802 | 12/2021 |
| CN | 115497965 | 12/2022 |
| JP | 2020102703 | 7/2020 |

OTHER PUBLICATIONS

CNIPA, First Office Action for CN Application No. 202310811603.9, Aug. 11, 2023.

* cited by examiner

*Primary Examiner* — Wesner Sajous

(74) *Attorney, Agent, or Firm* — Hodgson Russ LLP

(57) ABSTRACT

A halo test method includes selecting one or more to-be-tested regions from a to-be-tested display device; and lighting up a target test region with a preset grey scale; and then obtaining luminances where a plurality of unlit pixel points within a preset range from the target test region are located, and obtaining the normalized grey scales corresponding to the luminances where each unlit pixel point is located; and then based on the normalized grey scale corresponding to the luminance, obtaining normalized grey scale difference information measured in the target test region; and obtaining a halo value of the to-be-tested display device based on the normalized grey scale difference information measured in the one or more to-be-tested regions.

19 Claims, 8 Drawing Sheets

(58) Field of Classification Search
CPC ............ H04N 5/57–58; H04N 9/64–79; H10F 39/11–24
See application file for complete search history.

(a)

(b)

(c)

(d)

HALO TEST METHOD AND HALO TEST DEVICE

CROSS-REFERENCE TO RELATED APPLICATIONS

The present disclosure claims priority to Chinese Patent Application No. 202310811603.9, filed Jul. 4, 2023, the entire disclosure of which is incorporated herein by reference.

TECHNICAL FIELD

The present disclosure relates to the technical field of halo test, and particularly relates to a halo test method and a halo test device.

BACKGROUND

Local Dimming (also known as local backlight adjustment) as a display device backlight system technology, due to its low power consumption and high contrast, etc., is widely favoured by consumers, but its backlight control has some problems, such as halo problem. How to evaluate the merits of halo is of great significance for the determination and improvement of the display quality of display devices.

SUMMARY

There is provided a halo test method and a halo test device according to embodiments of the present disclosure. The technical solution is as below:

According to a first aspect of an embodiment of the present disclosure, the present disclosure discloses a halo test method, which includes:

- selecting one or more to-be-tested regions from a display region of a to-be-tested display device;
- lighting up a target test region with a preset grey scale, wherein the target test region is one of the to-be-tested regions;
- obtaining luminances where a plurality of unlit pixel points within a preset range from the target test region are located;
- based on the luminances where each of the plurality of unlit pixel points in a same direction of the target test region is located and a display luminance of the display region when the to-be-tested display device is lit up with the preset grey scale, obtaining normalized grey scales corresponding to the luminances where each unlit pixel point is located;
- based on the normalized grey scales corresponding to the luminances where each unlit pixel point in the same direction of the target test region is located, obtaining normalized grey scale difference information measured in the target test region; and
- obtaining a halo value of the to-be-tested display device based on the normalized grey scale difference information measured in the one or more to-be-tested regions.

According to a second aspect of the embodiment of the present disclosure, the present disclosure discloses a halo test device, including: one or more processors; and memory for storing one or more computer programs; wherein when the one or more computer programs are executed by the one or more processors, the processors implement a halo test method as mentioned above.

It should be understood that the above general description and the later detailed description are only exemplary and do not limit the scope of the present disclosure.

BRIEF DESCRIPTION OF THE DRAWINGS

The accompanying drawings herein, which are incorporated into and form a part of the specification, illustrate embodiments in accordance with the present disclosure and are used in conjunction with the specification to explain the principles of the present disclosure.

DETAILED DESCRIPTION OF THE EMBODIMENTS

Embodiments will now be described more fully with reference to the accompanying drawings. However, the embodiments are capable of being implemented in a plurality of forms and should not be construed as being limited to the embodiments set forth herein; rather, the provision of these embodiments allows for a more comprehensive and complete description of the present disclosure and conveys the idea of the embodiments in a comprehensive manner to those skilled in the art.

In the description of the present disclosure, unless otherwise indicated, the term "plurality" refers to two or more.

Furthermore, the terms "first", "second", "third", and "fourth" are used only for descriptive purposes and are not to be understood as indicating or implying relative importance or implicitly specifying the number of technical features indicated. Accordingly, a feature defined with "first", "second", "third", and "fourth" may expressly or implicitly include one or more technical features.

Figure 1:
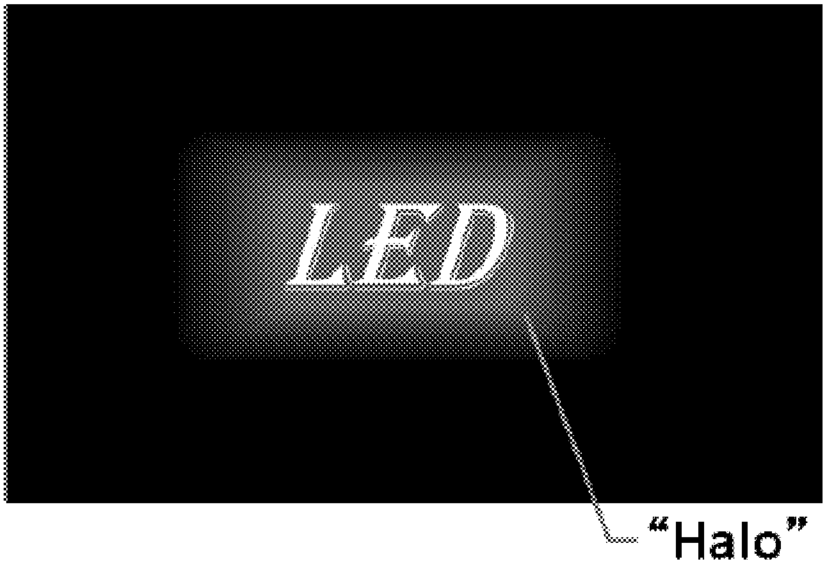
FIG. 1 is a display image of a poor halo.

Local Dimming (also known as Local Backlight Adjustment) as a display device backlight system technology, is to divide the backlight of the LCD into more than N small regions (i.e., N backlight partitions, N is an integer greater than 1), when working, the luminance and darkness of the backlight is adjusted according to the grey scale of the content of the liquid crystal display corresponding to the corresponding small regions, to save energy and enhance the quality of the picture. However, the backlight control currently has some problems, such as halo problem, which mainly exists in the black region around some bright objects, due to the diffuse nature of the backlight, the leakage of light decreases with the increase of the distance from the bright objects. A display image of the poor halo is shown in FIG. 1.

How to evaluate the merits of halo is important for the determination and improvement of display quality, but currently, there is not any standard method in the industry to evaluate the halo phenomenon. In order to measure the halo, the Applicant think of using the centre of the display region of the display device as a test region, and the dimensions of the test region are $\sqrt{kH}*\sqrt{kK}$, k=0.1, 0.2, . . . 1, H denotes a width of the entire display region of the display device, and K denotes a length of the entire display region of the display device. An all-white screen is displayed in the test region, and an all-black screen is displayed in other non-test region, and the luminance of the test region is measured, and then the halo value is calculated based on the following mapping relationship:

$$H = \frac{L_{box} - L_k}{L_w} \times 100\%;$$

Figure 2:
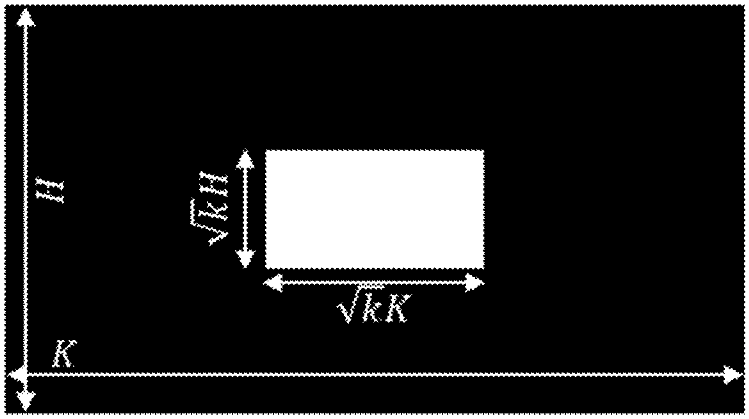
FIG. 2 is a schematic diagram of a halo test screen in a halo test embodiment.

H denotes the halo value, $L_{box}$, denotes the luminance when the test region displays an all-white screen, $L_k$ denotes the luminance when the entire display region of the display device displays an all-black screen, and $L_w$ denotes the luminance when the entire display region of the display device displays an all-white screen. The specific halo test screen is shown in FIG. 2.

Figure 3:
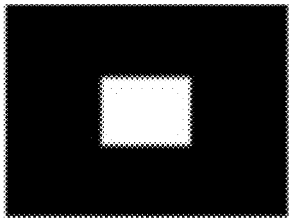
FIG. 3 is the effect of different sizes of backlight partitions on halos.
Figure 3:
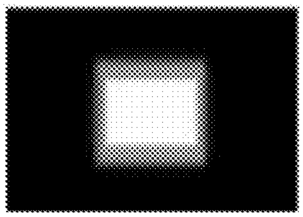
Figure 3:
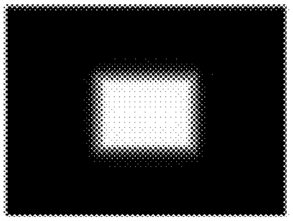
Figure 3:
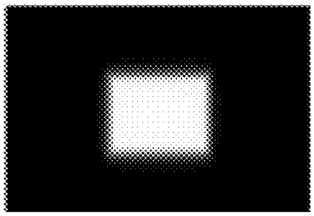

Although the halo value of the display device can be obtained by the aforementioned method, the method does not take into account the effect of the size of the backlight partition on the test results, for the same size of the display device, the more the number of backlight partitions, the smaller the size of the backlight partition, then the finer the backlight modulation, the lighter the halo, which is related to the small interference of the light and the resolution of the human eye. The effect of the different sizes of the backlight partitions on halo is as shown in FIG. 3. FIG. 3(*a*) represents the ideal display image, FIG. 3 (*b*) represents the display image in the case of 176 backlight partitions, FIG. 3(*c*) represents the display image in the case of 480 backlight partitions, and FIG. 3 (*d*) represents the display image in the case of 1440 backlight partitions. The region of the halo is generally very small, and the human eye is exceptionally sensitive to the perception of images with obvious regional contrasts, so if the effect of the size of the backlight partition on the test results is not taken into account, the halo value obtained may not be representative of the actual display quality of the display device, i.e., there may be a phenomenon that the halo value is very small, but the actual display quality is very poor.

Thus, the present disclosure provides a halo test method, which makes the halo test results closely related to the actual display quality of the display device, thereby enabling the halo test results to accurately represent the actual display quality of the display device.

Figure 4:
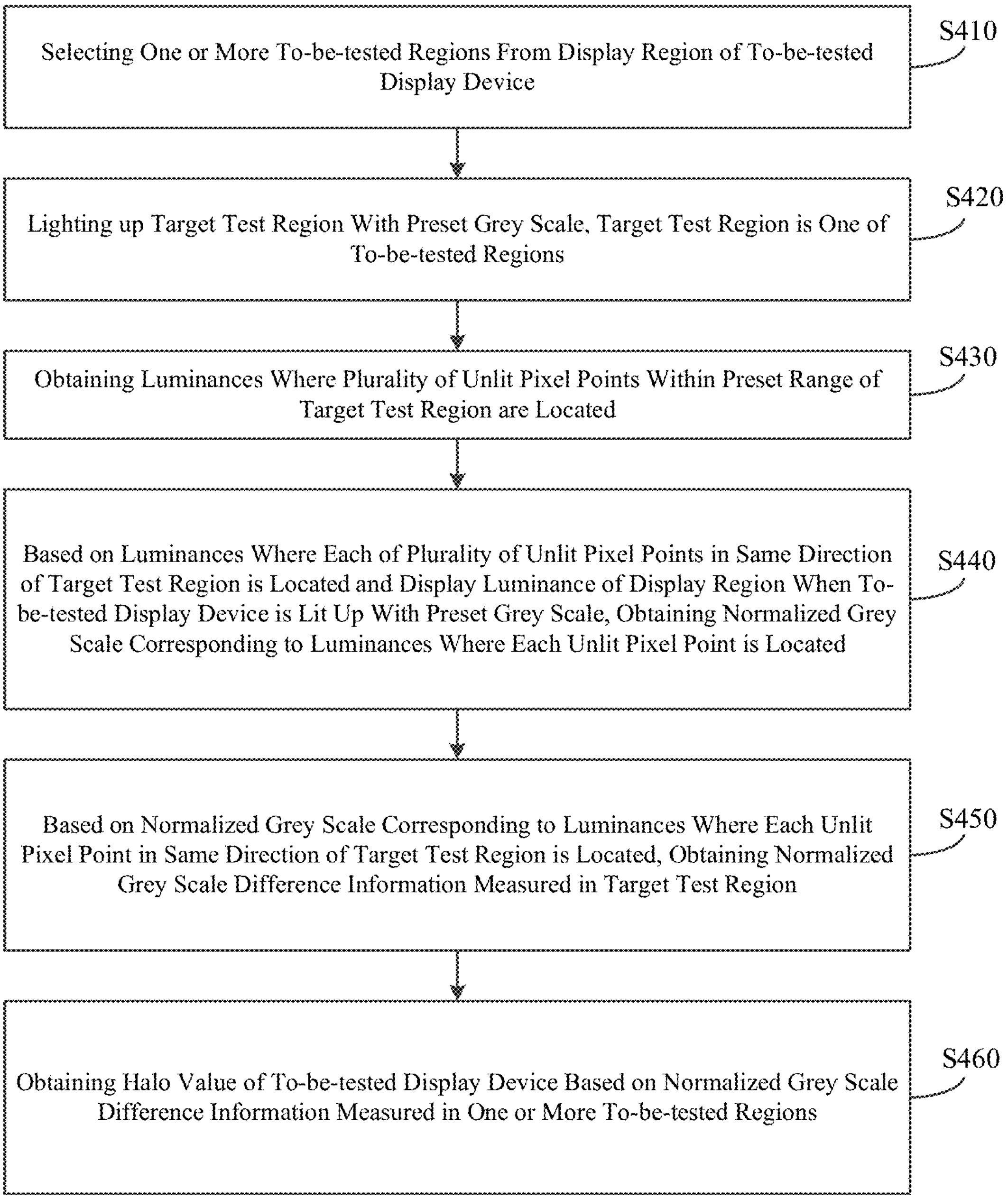
FIG. 4 is a flowchart of a halo test method according to an embodiment of the present disclosure.

FIG. 4 is a flowchart of a halo test method according to an embodiment of the present disclosure.

As shown in FIG. 4, the halo test method according to an embodiment of the present disclosure includes S410 to S460, as follows:

S410, selecting one or more to-be-tested regions from a display region of a to-be-tested display device.

The display region of the to-be-tested display device refers to a region of the display panel of the to-be-tested display device that can display an image, such as a middle region of the display panel; correspondingly, a region that cannot display an image is a non-display region, such as an edge region of the display panel.

The to-be-tested region can be located at the centre of the display region, i.e., the centre of the to-be-tested region coincides with the centre of the display region. In fact, the centre of the display region is the brightest position, and the selected to-be-tested region is located at the centre of the display region, so that the halo value finally obtained is more representative of the actual display quality. Of course, the to-be-tested region may also be located at other positions of the display region, i.e., the centre of the to-be-tested region is deviated from the centre of the display region.

The one or more to-be-tested regions selected from the display region of the to-be-tested display device can be that one to-be-tested region is selected from the display region of the to-be-tested display device, or a plurality of to-be-tested regions are selected from the display region of the to-be-tested display device, e.g. two, three, or four to-be-tested regions can be selected out, etc.

When the plurality of to-be-tested regions are selected from the display region of the to-be-tested display device, the plurality of to-be-tested regions may have overlapping portions or may be completely independent of each other.

In one embodiment of the present disclosure, the plurality of to-be-tested regions (for example, three to-be-tested regions, hereinafter referred to as a first to-be-tested region, a second to-be-tested region, and a third to-be-tested region) are selected from the display region of the to-be-tested display device, and the centres of the plurality of to-be-tested regions are coincided. The size of the third to-be-tested region is larger than that of the second to-be-tested region, and the size of the second to-be-tested region is larger than that of the first to-be-tested region.

Further, in one embodiment, the centres of the first to-be-tested region, the second to-be-tested region and the third to-be-tested region coincide with the centre of the display region.

In one embodiment, the first to-be-tested region, the second to-be-tested region, and the third to-be-tested region are rectangular, but of course, and may be, for example, circular, etc.

The to-be-tested regions may correspond to integer multiples of the backlight partitions, and the to-be-tested regions may also correspond to non-integer multiples of the backlight partitions.

In one embodiment of the present disclosure, the plurality of to-be-tested regions are selected from the display region of the to-be-tested display device, the plurality of to-be-tested regions include at least one to-be-tested region corresponding to the integer multiples of backlight partitions and at least one to-be-tested region corresponding to the non-integer multiples of backlight partitions.

In one embodiment, the plurality of to-be-tested regions include a to-be-tested region corresponding to 1 backlight partition (a first to-be-tested region), a to-be-tested region corresponding to 1.5 backlight partitions (a second to-be-tested region), and a to-be-tested region corresponding to 2 backlight partitions (a third to-be-tested region).

Further, centres of the first to-be-tested region, the second to-be-tested region and the third to-be-tested region coincide with a centre of the display region.

It should be noted that the plurality of to-be-tested regions is not limited to including a to-be-tested region corresponding to 1 backlight partition, a to-be-tested region corresponding to 1.5 backlight partitions, and a to-be-tested region corresponding to 2 backlight partitions. For example, the plurality of to-be-tested regions include a to-be-tested region corresponding to 1 backlight partition and a to-be-tested region corresponding to 1.5 backlight partitions. For example, the plurality of test regions include the to-be-tested region corresponding to 1 backlight partition, the to-be-tested region corresponding to 1.3 backlight partitions, the to-be-tested region corresponding to 1.5 backlight partitions, the to-be-tested region corresponding to 1.8 backlight partitions, and the to-be-tested region corresponding to 2 backlight partitions, etc.

Through selecting at least one to-be-tested region corresponding to an integer multiple of the backlight partitions and at least one to-be-tested region corresponding to a non-integer multiple of the backlight partitions. When the backlight partitions is lighted up by the subsequent steps, a halo condition of the display image can be obtained when the backlight partitions are partially lit up and partially not lit up, so as to make the obtained halo value more representative.

In some embodiments, a plurality of to-be-tested regions can be selected from the display region of the to-be-tested display device, and the plurality of to-be-tested regions all correspond to integer multiples of the backlight partitions; or, the plurality of to-be-tested regions all correspond to non-integer multiples of the backlight partitions.

S420, lighting up a target test region with a preset grey scale, the target test region is one of the to-be-tested regions.

The target test region is the to-be-tested region, i.e., when the to-be-tested region is selected out in S410, the target test region is the selected to-be-tested region, and when the plurality of to-be-tested regions are selected out in S410, the target test region is one of the plurality of to-be-tested regions.

S420, when the target test region is lit up with the preset grey scale, the non-target test region other than the target test region in the display region is set to 0 grey scale (an all-black screen is displayed), at this time, the luminance of the non-target test region is caused by the leakage of light from the target test region, and the luminances where the unlit pixel points obtained by the subsequent steps are located are more accurate, thereby making the halo value finally obtained more accurate.

In one embodiment of the present disclosure, the preset grey scale is 255 grey scales, i.e., the target test region is made to display an all-white screen, and the non-target test region in the display region other than the target test region is set to 0 grey scale, i.e., the non-target test region other than the target test region in the display region is made to display an all-black screen.

The target test region is made to display the all-white screen, and the non-target test region in the display region other than the target test region is made to display the all-black screen (not lit up) simultaneously, the black-and-white contrast is more obvious, the luminances where the unlit pixel points obtained by the subsequent steps are located are more accurate, and the halo value finally obtained is more accurate.

Of course, in other embodiments, the preset grey scale may also be other grey scale values. Exemplarily, in one embodiment, the preset grey scale is 64 grey scales, at this time, the non-target test region in the display region other than the target test region is set to 0 grey scale. In one embodiment, the preset grey scale is 128 grey scales, at this time, the non-target test region in the display region other than the target test region is set to 0 grey scale.

S430, obtaining luminances where a plurality of unlit pixel points within a preset range from the target test region are located.

The obtaining luminances where the plurality of unlit pixel points within the preset range from the target test region are located may be obtaining the luminances where all the unlit pixel points within the preset range from the target test region are located, or obtaining the luminances where a portion of the unlit pixel points within the preset range from the target test region are located, of course, this portion of the unlit pixel points need to at least include the unlit pixel points nearest to the target test region and the unlit pixel points whose distance from the target test region is equal to the preset range, in the same direction of the target test region.

The obtaining luminances where the plurality of unlit pixel points within the preset range from the target test region are located may be either obtaining the luminances where the unlit pixel points in a plurality of directions and within the preset range from the target test region are located, or obtaining the luminances where the unlit pixel points within the preset range from the target test region and in a particular direction of the target test region are located.

A display image of the entire display region can be captured by using a two-dimensional imaging luminance meter, so as to measure the luminance of each pixel point in the display region, and thus the luminances where the plurality of unlit pixel points within the preset range from the target test region are located may be obtained by S430.

Figure 5:
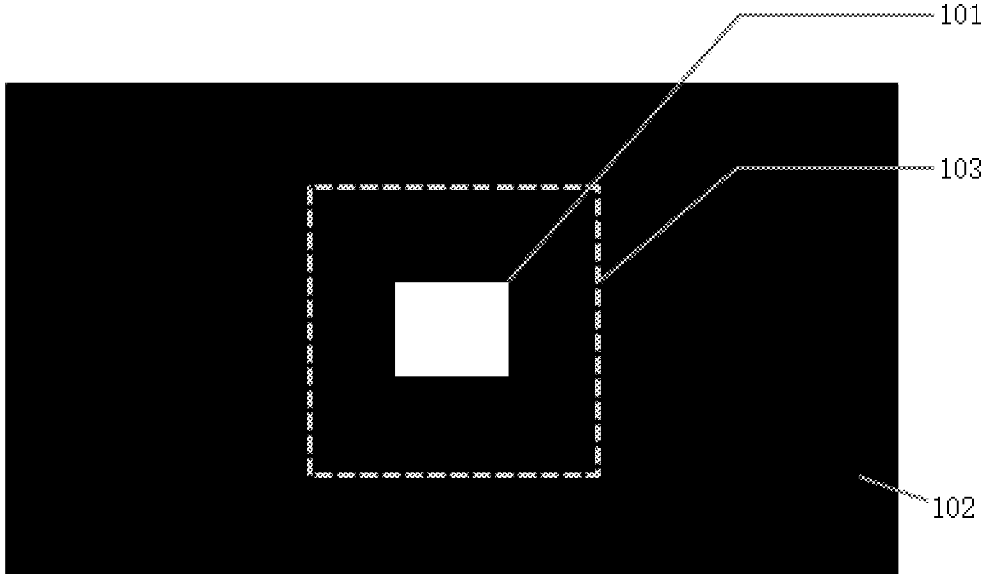
FIG. 5 is a schematic diagram of a halo test screen according to an embodiment of the present disclosure.

In one embodiment of the present disclosure, the preset range is 200 pixel points. That is, in S430, the luminances where the plurality of unlit pixel points within a distance of 200 pixel points from the target test region are located are obtained. When the preset range is 200 pixel points, a halo test screen is shown in FIG. 5, a marker 101 indicates the target test region, a marker 102 indicates the non-target test region, and a marker 103 indicates the location with the distance of 200 pixel points from the target test region.

When the non-target test region in the display region other than the target test region displays an all-black screen, at the distance of 200 pixel points from the target test region, since the leakage of light decreases as the distance from the bright object increases, the luminance of the pixel point essentially corresponds to 0 grey scale or is already close to 0 grey scale, so this embodiment sets the preset range to be 200 pixel points, which ensures that the test results are accuracy while taking into account the amount of luminance data calculation, thereby improving the efficiency of the halo test.

Of course, the preset range may also be other values, for example, the preset range is 180 pixel points. That is, in S430, the luminances where a plurality of unlit pixel points within a distance of 180 pixel points from the target test region are located are obtained. For example, the preset range is 210 pixel points, that is, in S430, the luminances where the plurality of unlit pixel points within a distance of 210 pixel points from the target test region are located are obtained.

S440, based on the luminances where each of the plurality of unlit pixel points in a same direction of the target test region is located and a display luminance of the display region when the to-be-tested display device is lit up with the preset grey scale, obtaining normalized grey scales corresponding to the luminances where each unlit pixel point is located.

That is, based on the luminances where each of the plurality of unlit pixel points in the same direction of the target test region within a preset range from the target test region is located and the display luminance of the display region when the to-be-tested display device is lit up with the preset grey scale, the normalized grey scales corresponding to the luminances where each unlit pixel is located are obtained.

In S440, the normalized grey scales corresponding to the luminances where all unlit pixel points within the preset range from the target test region and in the same direction of the target test region are located may be obtained, or the normalized grey scales corresponding to the luminances where a portion of the unlit pixel points within the preset range from the target test region and in the same direction of the target test region are located may be obtained, of course, this portion of the unlit pixel points must at least include the unlit pixel point nearest to the target test region and the unlit pixel point whose distance from the target test region is equal to the preset range.

In one embodiment of the present disclosure, based on a mapping relationship $$S = 255 \times \left(\frac{L_{dot_i}}{L_{255}}\right)^{\left(\frac{1}{2.2}\right)},$$

i=1, 2, . . . M (M is 200 when the preset range is 200 pixel points, M is 180 when the preset range is 180 pixel points, M is 210 when the preset range is 210 pixel points, and so on), normalized grey scales corresponding to the luminances where each unlit pixel point is located are obtained. S indicates the normalized grey scale corresponding to the luminance where the unlit pixel point is located, $L_{dot_i}$ indicates the luminance where the $i_{th}$ unlit pixel point distance from the target test region and in the same direction of the target test region is located, and $L_{255}$ indicates the display luminance of the display region when the to-be-tested display device is lit up with the preset grey scale.

Each unlit pixel point in the same direction of the target test region is located in the same side of the target test region and in the same straight line as the centre of the target test region.

In S440, the normalized grey scales corresponding to the luminances where each unlit pixel point in one direction of the target test region is located may be obtained, or the normalized grey scales corresponding to the luminances where each unlit pixel point in a plurality of directions of the target test region is located may be obtained separately.

Figure 6:
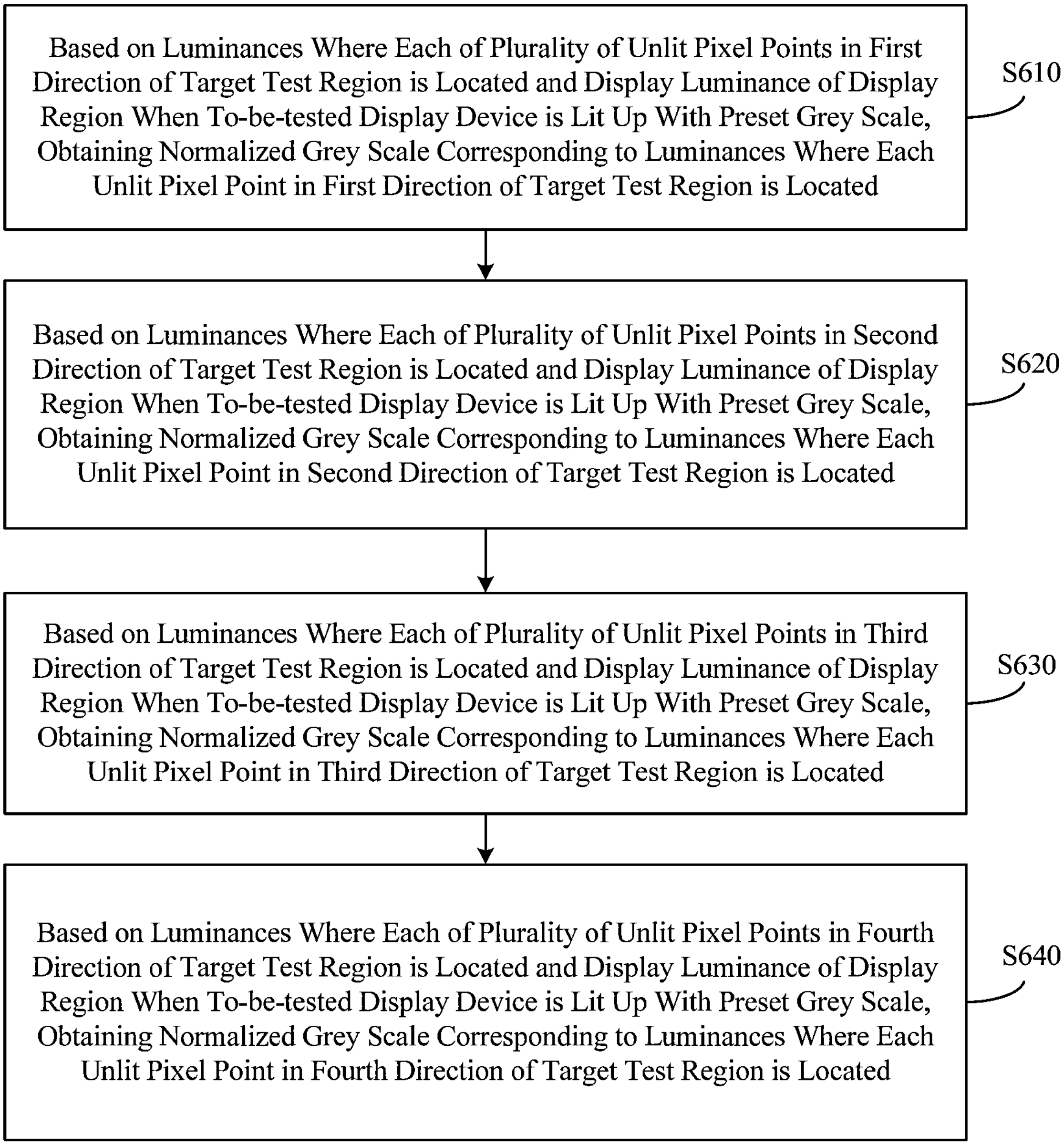
FIG. 6 is a detailed flowchart of S440 shown in FIG. 4.

When lighting up the target test region, the grey scale voltage signal is output by the data driver and then transmitted to each pixel point in the target test region via the data line, thereby lighting up the target test region. During the transmission of the grey scale voltage signal through the data line, due to the internal resistance of the data line, the farther the pixel points in the target test region are from the data driver, the smaller the grey scale voltage signal received by the pixel points will be, resulting in a lower display luminance of the pixel points, and the leakage of light will be smaller; on the contrary, the closer the pixel points in the target test region are from the data driver, the bigger the grey scale voltage signal received by the pixel points will be, and the higher the display luminance will be, and then more the light will be leaked. In different display devices, the data driver may be provided at different positions, for example, in some display devices, the data driver is provided above the display panel, while in other display devices, the data driver is provided below the display panel. Thus, in one embodiment of the present disclosure, in S440, normalized grey scales corresponding to the luminances where each unlit pixel point in the plurality of directions of the target test region is located are obtained separately, so that the halo value obtained by the subsequent steps is more accurate. In detail, as shown in FIG. 6, S440 includes S610 to S640 as follows.

S610, based on the luminances where each of the plurality of unlit pixel points in a first direction of the target test region is located and the display luminance of the display region when the to-be-tested display device is lit up with the preset grey scale, obtaining the normalized grey scales corresponding to the luminances where each unlit pixel point in the first direction of the target test region is located.

S620, based on the luminances where each of the plurality of unlit pixel points in a second direction of the target test region is located and the display luminance of the display region when the to-be-tested display device is lit up with the preset grey scale, obtaining the normalized grey scales corresponding to the luminances where each unlit pixel point in the second direction of the target test region is located.

S630, based on the luminances where each of the plurality of unlit pixel points in a third direction of the target test region is located and the display luminance of the display region when the to-be-tested display device is lit up with the preset grey scale, obtaining the normalized grey scales corresponding to the luminances where each unlit pixel point in the third direction of the target test region is located.

S640, based on the luminances where each of the plurality of unlit pixel points in a fourth direction of the target test region is located and the display luminance of the display region when the to-be-tested display device is lit up with the preset grey scale, obtaining the normalized grey scales corresponding to the luminances where each unlit pixel point in the fourth direction of the target test region is located.

The first direction is opposite to the second direction, the third direction is opposite to the fourth direction, and the first direction and the second direction are perpendicular to the third direction and the fourth direction. That is, the normalized grey scales corresponding to the luminances where each unlit pixel point in the four directions of the target test region is located are obtained, at this time, the normalized grey scale difference in the four directions of the target test region can also be obtained by the subsequent steps, so as to further obtain a more accurate halo value.

Further, in one embodiment, the first direction, the centre of the target test region, and the second direction are located on the same straight line, and the straight line is the central axis of the target test region; similarly, the third direction, the centre of the target test region, and the fourth direction are located on the same straight line, and the straight line is the central axis in another direction of the target test region. Since the centre of the display region has the brightest luminance, by this setting, the halo value finally obtained by the subsequent steps is more representative of the actual display quality.

Of course, in other embodiments, in S440, it is also possible to only obtain the normalized grey scales corresponding to the luminances where each unlit pixel in the first direction of the target test region is located; or, obtain the normalized grey scales corresponding to the luminances where each unlit pixel in the first direction and the second direction of the target test region is located; or, obtain the normalized grey scales corresponding to the luminances where each unlit pixel in the third direction of the target test region is located; or, obtain the normalized grey scales corresponding to the luminances where each unlit pixel in the third direction of the target test region and the fourth direction of the target test region is located, etc., which will not be exampled herein.

In some embodiments, it is also possible to set up that the first direction, the centre of the target test region, and the second direction are located on the same straight line, which is a diagonal line of the target test region; similarly, the third direction, the centre of the target test region, and the fourth direction are located on the same straight line, which is another diagonal line of the target test region. In addition, the first direction and the second direction may also be located on two parallel straight lines, respectively; similarly, the third direction and the fourth direction may be located on two parallel straight lines, respectively.

It is to be noted that before based on the luminances where each of the plurality of unlit pixel points in the same direction of the target test region is located and a display luminance of the display region when the to-be-tested display device is lit up with the preset grey scale, obtaining the normalized grey scales corresponding to the luminances where each unlit pixel point is located, it is necessary to first perform lighting up the to-be-tested display device with the preset grey scale, and at this time, that is to say, lighting up the entire display region of the to-be-tested display device, and obtaining the display luminance of the display region when the to-be-tested display device is lit up with the preset grey scale.

In one embodiment of the present disclosure, the to-be-tested region is located at a centre of the display region, and accordingly, the display luminance at the centre of the display region are obtained when the to-be-tested display device is lit up with the preset grey scale. In S440, based on the luminances where each of the plurality of unlit pixel points in the same direction of the target test region is located and the display luminance of the display region when the to-be-tested display device is lit up with the preset grey scale, the normalized grey scales corresponding to the luminances where each unlit pixel point is located are obtained. Thus, the halo value finally obtained can be more representative of the actual display quality.

S450, based on the normalized grey scales corresponding to the luminances where each unlit pixel point in the same direction of the target test region is located, obtaining normalized grey scale difference information measured in the target test region.

Figure 7:
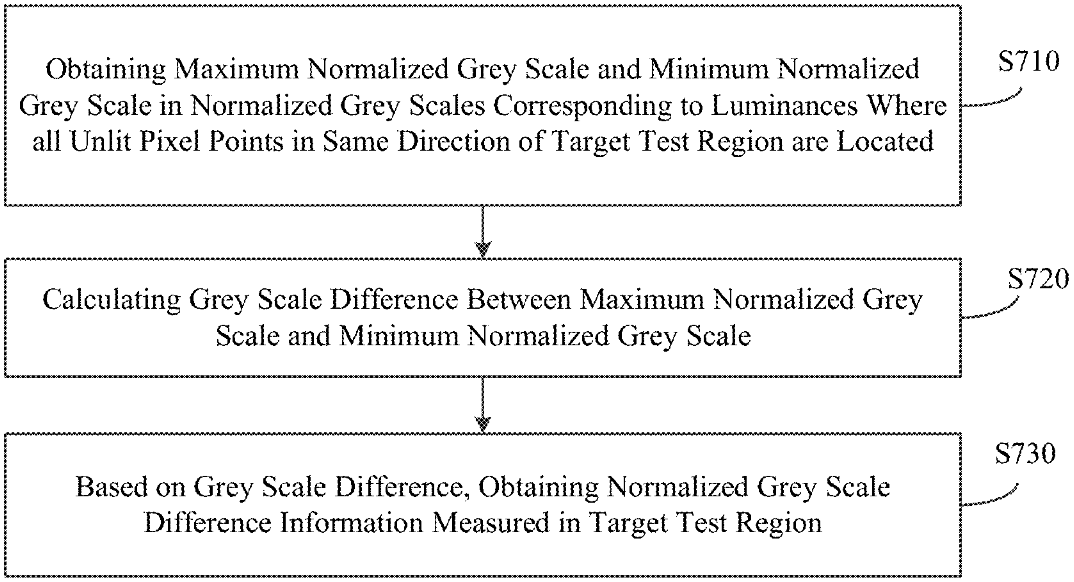
FIG. 7 is a detailed flowchart of S450 shown in FIG. 4.

In one embodiment of the present disclosure, as shown in FIG. 7, S450 includes S710 to S730 as follows.

S710, obtaining a maximum normalized grey scale and a minimum normalized grey scale in the normalized grey scales corresponding to the luminances where all unlit pixel points in the same direction of the target test region are located.

When the normalized grey scales corresponding to the luminances where each unlit pixel in the plurality of directions of the target test region is located are obtained in S440, in S710, the maximum normalized grey scale and the minimum normalized grey scale in the normalized grey scales corresponding to the luminances where each unlit pixel in each direction of the target test region is located are obtained.

When only the normalized gray scales corresponding to the luminances where the unlit pixel points in one direction of the target test region are located are obtained in S440, in S710, the maximum normalized gray scale and the minimum normalized gray scale in the normalized gray scales corresponding to the luminances where the unlit pixel points in that one direction of the target test region are located are obtained.

S720, calculating a grey scale difference between the maximum normalized grey scale and the minimum normalized grey scale.

In detail, the grey scale difference between the maximum normalized grey scale and the minimum normalized grey scale is calculated based on a mapping relationship $\Delta S_{direction}=S_{max}-S_{min}\cdot\Delta S_{direction}$ represents the grey scale difference corresponding to a certain direction, $S_{max}$ represents the maximum normalized grey scale in the normalized grey scales corresponding to the luminances where each unlit pixel point in a certain direction of the target test region is located, $S_{min}$ represents the minimum normalized grey scale in the normalized grey scales corresponding to the luminances where each unlit pixel point in a certain direction of the target test region is located. The certain direction may be, for example, a first direction, or a second direction, or a third direction, or a fourth direction, as described previously.

When the maximum normalized gray scale and the minimum normalized gray scale in the normalized gray scales corresponding to the luminances where all unlit pixel points in one direction of the target test region are located are obtained in S710. In S720, a gray scale difference between the maximum normalized gray scale and the minimum normalized gray scale in the normalized gray scales corresponding to the luminances where all unlit pixel points in the one direction are located are calculated. At this time, one grey scale difference corresponding to this direction can be obtained.

When the maximum normalized gray scale and the minimum normalized gray scale in the normalized gray scales corresponding to the luminances where all unlit pixel points in a plurality of directions of the target test region are located are obtained separately in S710. In S720, a gray scale difference between the maximum normalized gray scale and the minimum normalized gray scale in the normalized gray scales corresponding to the luminances where all unlit pixel points in each direction are located are calculated separately. At this time, a plurality of grey scale differences corresponding to one direction, respectively, can be obtained.

S730, based on the grey scale difference, obtaining the normalized grey scale difference information measured in the target test region.

When one grey scale difference is obtained in S720, the one grey scale difference is the normalized grey scale difference information measured in the target test region.

When a plurality of grey scale differences are obtained in S720, the normalized grey scale difference information measured in the target test region is obtained based on the plurality of grey scale differences. Exemplarily, four grey scale differences corresponding to the first direction, the second direction, the third direction and the fourth direction are obtained in S720, and in S730, the minimum grey scale difference in all the grey scale differences corresponding to the first direction, the second direction, the third direction and the fourth direction is used as the normalized grey scale difference information measured in the target test region.

The closer the unlit pixel point to the target test region, the higher the luminance where the unlit pixel point is located, and the higher the normalized grey scale corresponding to the luminance; the further the unlit pixel point from the target test region, the lower the luminance where the unlit pixel point is located, and the lower the normalized grey scale corresponding to the luminance. The larger the difference between the maximum normalized grey scale and the minimum normalized grey scale, the faster the luminance decreases, and the smaller the impact on the surrounding non-target region. The smaller the difference between the maximum normalized grey scale and the minimum normalized grey scale, the slower the luminance decreases, and the larger the impact on the surrounding non-target region. Therefore, the larger the difference between the grey scales, then the smaller the halo, and the smaller the difference between the grey scales, then the larger the halo, thus the minimum grey scale difference in the plurality of directions is taken as the normalized grey scale difference information measured in the target test region.

It is to be noted that in other embodiments, the normalized grey scale difference information corresponding to the target test region may also be obtained in other ways, for example, when a plurality of grey scale differences are obtained in S720, in S730, an average of the plurality of grey scale differences is taken as the normalized grey scale difference corresponding to the target test region.

S460, obtaining a halo value of the to-be-tested display device based on the normalized grey scale difference information measured in the one or more to-be-tested regions.

In one embodiment of the present disclosure, S460 includes: obtaining a minimum grey scale difference in all the normalized grey scale difference information measured in the one or more to-be-tested regions, and taking the minimum grey scale difference as the halo value of the to-be-tested display device.

That is, when the normalized grey scale difference information measured in the plurality of to-be-tested regions is obtained by the aforementioned S410 to S450, the minimum normalized grey scale difference in the normalized grey scale difference information measured in the plurality of to-be-tested regions is taken as the halo value of the to-be-tested display device. That is, when the normalized grey scale difference information measured in only one the to-be-tested region is obtained by the aforementioned S410 to S450, the normalized grey scale difference information measured in that one to-be-tested region is taken as the halo value of the to-be-tested display device.

The larger the grey scale difference, then the smaller the halo, and the smaller the grey scale difference, then the larger the halo, and when the normalized grey scale difference information measured in the plurality of to-be-tested regions is obtained through the aforementioned S410 to S450, the minimum grey scale difference in the normalized grey scale difference information measured in the plurality of to-be-tested regions is taken as the halo value of the to-be-tested display device.

Of course, when the normalized grey scale difference information measured in the plurality of to-be-tested regions is obtained by the aforementioned S410 to S450, it is also possible to obtain the halo value of the to-be-tested display device in other ways, for example, the average value of the normalized grey scale difference information measured in the plurality of to-be-tested regions is taken as the halo value of the to-be-tested display device.

Figure 8:
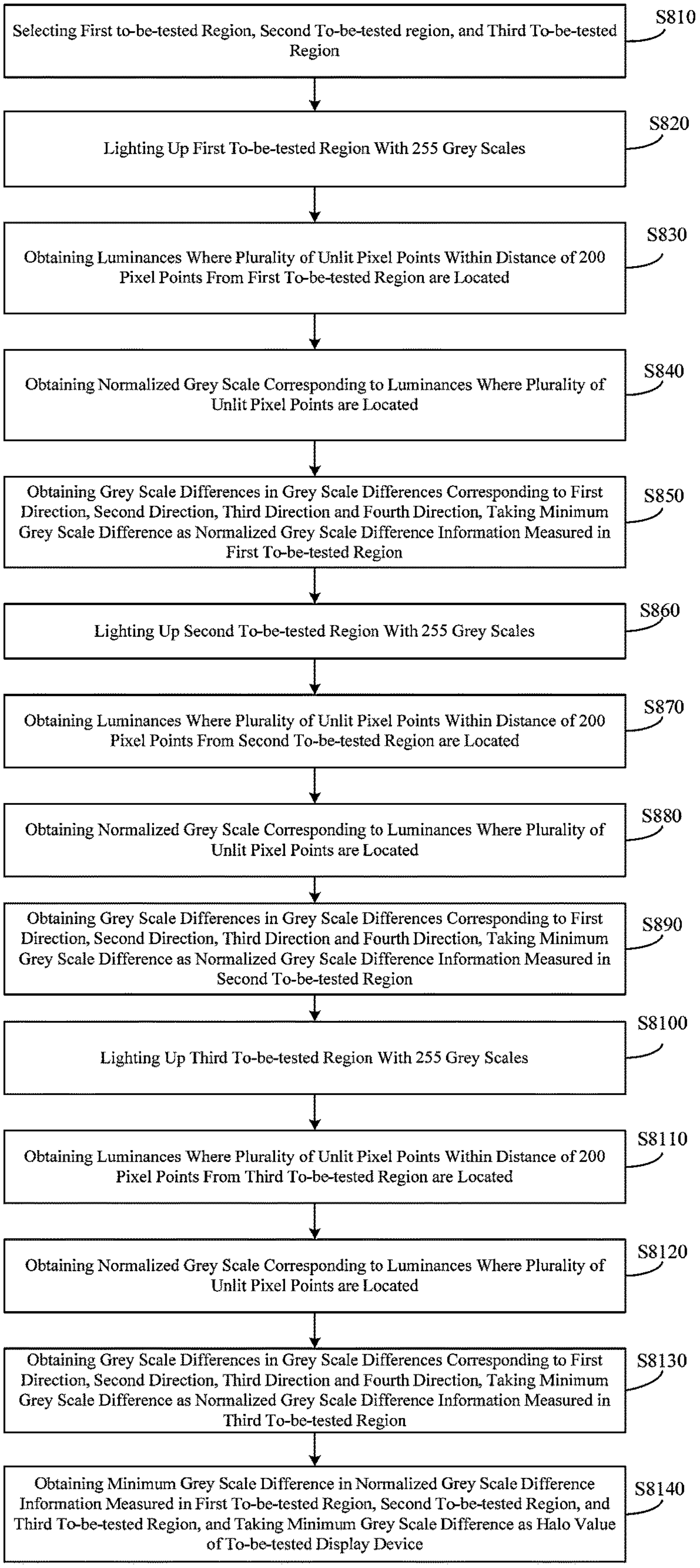
FIG. 8 is a flowchart of a halo test method according to an embodiment of the present disclosure.

FIG. 8 is a flowchart of a halo test method according to an embodiment of the present disclosure.

As shown in FIG. 8, the halo test method provided in an embodiment of the present disclosure includes S810 to S8140 as follows.

S810, selecting a first to-be-tested region, a second to-be-tested region, and a third to-be-tested region from a display region of the to-be-tested display device. The first to-be-tested region corresponds to 1 backlight partition, the second to-be-tested region corresponds to 1.5 backlight partitions, and the third to-be-tested region corresponds to 2 backlight partitions.

S820, lighting up the first to-be-tested region (the target test region) with 255 grey scales.

S830, obtaining the luminances where a plurality of unlit pixel points within a distance of 200 pixel points from the first to-be-tested region are located.

S840, based on the luminances where each of the plurality of unlit pixel points in a first direction of the first to-be-tested region is located and the display luminance of the display region when the to-be-tested display device is lit up with 255 grey scales, obtaining the normalized grey scales corresponding to the luminances where each unlit pixel point in the first direction is located; based on the luminances where each of the plurality of unlit pixel points in a second direction of the first to-be-tested region is located and the display luminance of the display region when the to-be-tested display device is lit up with 255 grey scales, obtaining the normalized grey scales corresponding to the luminances where each unlit pixel point in the second direction is located; based on the luminances where each of the plurality of unlit pixel points in a third direction of the first to-be-tested region is located and the display luminance of the display region when the to-be-tested display device is lit up with 255 grey scales, obtaining the normalized grey scales corresponding to the luminances where each unlit pixel point in the third direction is located; based on the luminances where each of the plurality of unlit pixel points in a fourth direction of the first to-be-tested region is located and the display luminance of the display region when the to-be-tested display device is lit up with 255 grey scales, obtaining the normalized grey scales corresponding to the luminances where each unlit pixel point in the fourth direction is located.

S850, based on the maximum normalized grey scale and the minimum normalized grey scale in the normalized grey scales corresponding to the luminances where all unlit pixel points in the first direction are located, obtaining a grey scale difference corresponding to the first direction; based on the maximum normalized grey scale and the minimum normalized grey scale in the normalized grey scales corresponding to the luminances where all unlit pixel points in the second direction are located, obtaining a grey scale difference corresponding to the second direction; based on the maximum normalized grey scale and the minimum normalized grey scale in the normalized grey scales corresponding to the luminances where all unlit pixel points in the third direction are located, obtaining the grey scale difference corresponding to the third direction; based on the maximum normalized grey scale and the minimum normalized grey scale in the normalized grey scales corresponding to the luminances where all unlit pixel points in the fourth direction are located, obtaining the grey scale difference corresponding to the fourth direction; the minimum grey scale difference in the grey scale differences corresponding to the first direction, the second direction, the third direction and the fourth direction is used as the normalized grey scale difference information measured in the first to-be-tested region.

S860, lighting up the second to-be-tested region (the target test region) with 255 grey scales.

S870, obtaining luminances where a plurality of unlit pixel points within a distance of 200 pixel points from the second to-be-tested region are located.

S880, based on the luminances where each of the plurality of unlit pixel points in a first direction of the second to-be-tested region is located and the display luminance of the display region when the to-be-tested display device is lit up with 255 grey scales, obtaining the normalized grey scales corresponding to the luminances where each unlit pixel point in the first direction is located; based on the luminances where each of the plurality of unlit pixel points in a second direction of the second to-be-tested region is located and the display luminance of the display region when the to-be-tested display device is lit up with 255 grey scales, obtaining the normalized grey scales corresponding to the luminances where each unlit pixel point in the second direction is located; based on the luminances where each of the plurality of unlit pixel points in a third direction of the second to-be-tested region is located and the display luminance of the display region when the to-be-tested display device is lit up with 255 grey scales, obtaining the normalized grey scales corresponding to the luminances where each unlit pixel point in the third direction is located; based on the luminances where each of the plurality of unlit pixel points in a fourth direction of the second to-be-tested region is located and the display luminance of the display region when the to-be-tested display device is lit up with 255 grey scales, obtaining the normalized grey scales corresponding to the luminances where each unlit pixel point in the fourth direction is located.

S890, based on the maximum normalized grey scale and the minimum normalized grey scale in the normalized grey scales corresponding to the luminances where all unlit pixel points in the first direction are located, obtaining a grey scale difference corresponding to the first direction; based on the maximum normalized grey scale and the minimum normalized grey scale in the normalized grey scales corresponding to the luminances where all unlit pixel points in the second direction are located, obtaining a grey scale difference corresponding to the second direction; based on the maximum normalized grey scale and the minimum normalized grey scale in the normalized grey scales corresponding to the luminances where all unlit pixel points in the third direction are located, obtaining the grey scale difference corresponding to the third direction; based on the maximum normalized grey scale and the minimum normalized grey scale in the normalized grey scales corresponding to the luminances where all unlit pixel points in the fourth direction are located, obtaining the grey scale difference corresponding to the fourth direction; the minimum grey scale difference in the grey scale differences corresponding to the first direction, the second direction, the third direction and the fourth direction is used as the normalized grey scale difference information measured in the second to-be-tested region.

S8100, lighting up the third to-be-tested region (the target test region) with 255 grey scales.

S8110, obtaining the luminances where a plurality of unlit pixel within a distance of 200 pixel points from the third to-be-tested region are located.

S8120, based on the luminances where each of the plurality of unlit pixel points in a first direction of the third to-be-tested region is located and the display luminance of the display region when the to-be-tested display device is lit up with 255 grey scales, obtaining the normalized grey scales corresponding to the luminances where each unlit pixel point in the first direction is located; based on the luminances where each of the plurality of unlit pixel points in a second direction of the third to-be-tested region is located and the display luminance of the display region when the to-be-tested display device is lit up with 255 grey scales, obtaining the normalized grey scales corresponding to the luminances where each unlit pixel point in the second direction is located; based on the luminances where each of the plurality of unlit pixel points in a third direction of the third to-be-tested region is located and the display luminance of the display region when the to-be-tested display device is lit up with 255 grey scales, obtaining the normalized grey scales corresponding to the luminances where each unlit pixel point in the third direction is located; based on the luminances where each of the plurality of unlit pixel points in a fourth direction of the third to-be-tested region is located and the display luminance of the display region when the to-be-tested display device is lit up with 255 grey scales, obtaining the normalized grey scales corresponding to the luminances where each unlit pixel point in the fourth direction is located.

S8130, based on the maximum normalized grey scale and the minimum normalized grey scale in the normalized grey scales corresponding to the luminances where all unlit pixel points in the first direction are located, obtaining a grey scale difference corresponding to the first direction; based on the maximum normalized grey scale and the minimum normalized grey scale in the normalized grey scales corresponding to the luminances where all unlit pixel points in the second direction are located, obtaining a grey scale difference corresponding to the second direction; based on the maximum normalized grey scale and the minimum normalized grey scale in the normalized grey scales corresponding to the luminances where all unlit pixel points in the third direction are located, obtaining the grey scale difference corresponding to the third direction; based on the maximum normalized grey scale and the minimum normalized grey scale in the normalized grey scales corresponding to the luminances where all unlit pixel points in the fourth direction are located, obtaining the grey scale difference corresponding to the fourth direction; the minimum grey scale difference in the grey scale differences corresponding to the first direction, the second direction, the third direction and the fourth direction is used as the normalized grey scale difference information measured in the third to-be-tested region.

S8140, obtaining the minimum grey scale difference in the normalized grey scale difference information measured in the first to-be-tested region, the second to-be-tested region, and the third to-be-tested region, and taking the minimum grey scale difference as the halo value of the to-be-tested display device.

In summary, the halo test method disclosed in the present disclosure takes into account the influence of the size of the backlight partition of the Mini LED on the evaluation of the halo, and takes into account the difference between the halo value and the actual display quality, calculates the difference of the normalized grey scales of the unlit pixel points in the halo region point by point, and determines the halo value of to-be-tested display device based on the normalized grey scale difference information of normalized grey scales corresponding to the luminances where each unlit pixel point in the same direction of the target test region is located. Since the halo test results are closely related to the actual display quality of the display device, thus the halo test results can accurately represent the actual display quality of the display device, and this method still can accurately represent the actual display quality of the display device even though the display device is different, and can be suitable for different display devices.

Figure 9:
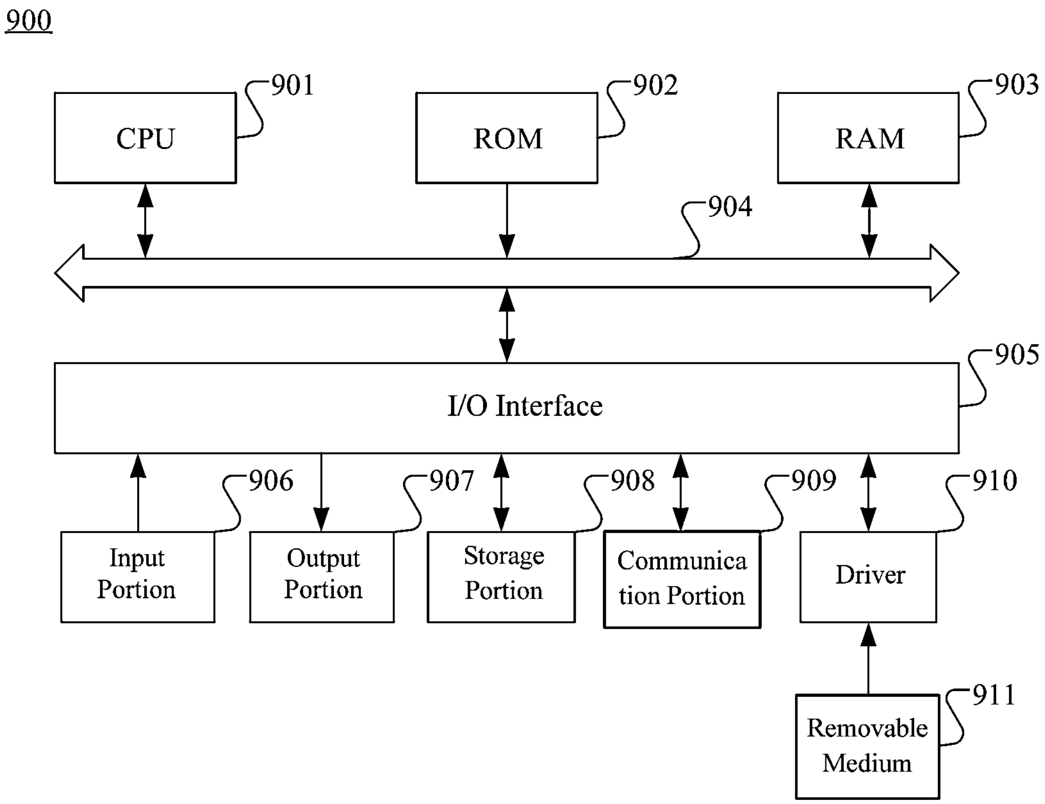
FIG. 9 is a schematic structural diagram of a computer system suitable for implementing a halo test device according to an embodiment of the present disclosure.

FIG. 9 is a schematic structure diagram of a computer system suitable for implementing the halo test method of the embodiment of the present disclosure.

It is to be noted that the computer system 900 of the halo test device illustrated in FIG. 9 is only an example, and should not bring in any limitation on the functions and scope of use of the embodiments of the present disclosure.

As shown in FIG. 9, the computer system 900 includes a Central Processing Unit (CPU) 901 which can perform various appropriate actions and processes, such as performing the halo test method in the above embodiment, based on a program stored in a Read-Only Memory (ROM) 902 or a program loaded from a storage portion 908 into a Random Access Memory (RAM) 903. Various programs and data required for operation of the system are also stored in the RAM 903. The CPU 901, the ROM 902, and the RAM 903 are connected to each other via a bus 904. The input/output (I/O) interface 905 is also connected to the bus 904.

The following components are connected to the I/O interface 905: an input portion 906 including a keyboard, a mouse, etc.; an output portion 907 including a cathode ray tube (CRT), a liquid crystal display (LCD), etc., and a speaker, etc.; a storage portion 908 including a hard disk, etc.; and a communication portion 909 including a network interface card such as a local region network (LAN) card, a modem, etc. The communication portion 909 performs communication processing via a network such as the Internet. The driver 910 is also connected to the I/O interface 905 as needed. The removable medium 911, such as disks, CD-ROMs, magnetic discs, semiconductor memories, etc., are mounted to the driver 910 as needed, so that computer programs read from it are mounted into the storage portion 908 as needed.

In particular, according to embodiments of the present disclosure, the process described above with reference to the flowchart may be implemented as a computer software program. For example, embodiments of the present disclosure include a computer program product including a computer program carried on a computer readable medium, the computer program include a computer program for performing the halo test method shown in the flowchart. In such an embodiment, the computer program may be downloaded from a network and installed via a communication portion 909, and/or installed from a removable medium 911. When the computer program is executed by the central processing unit (CPU) 901, various functions defined in the system of the present disclosure are performed.

It is noted that the computer-readable medium shown in embodiments of the present disclosure may be a computer-readable signal medium or a computer-readable storage medium or any combination of both. The computer-readable storage medium may be, for example, but is not limited to, a system, a device, or a component of electricity, magnetism, light, electromagnetism, infrared, or semiconductors, or any combination thereof. More specific examples of computer-readable storage medium may include, but are not limited to, an electrical connection having one or more wires, a portable computer disk, a hard drive, a random access memory (RAM), a read-only memory (ROM), an erasable programmable read only memory (EPROM), a flash memory, an optical fibre, a portable compact disc read-only memory (CD-ROM), an optical storage devices, a magnetic storage devices, or any suitable combination thereof. In the present disclosure, a computer-readable storage medium may be any tangible medium containing or storing a program that may be used by or in combination with an instruction execution system, device or component. And in this application, the computer-readable signal medium may include a data signal propagated in baseband or as part of a carrier carrying a computer-readable computer program. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates or transmits a program for use by, or in conjunction with, an instruction-executing system, device or component. The computer program contained on the computer-readable medium may be transmitted using any suitable medium, including, but not limited to: wireless, wired, etc., or any suitable combination of the foregoing.

The flowcharts and block diagrams in the accompanying drawings illustrate the architecture, functionality, and operation of systems, methods, and computer program products that may be implemented in accordance with various embodiments of the present disclosure. Each box in the flowcharts or block diagrams may represent a module, a program segment, or a portion of code, and the module, program segment, or portion of code contains one or more executable instructions for carrying out a prescribed logical function. It should also be noted that in some implementations as replacements, the functions indicated in the blocks may also occur in a different order than that indicated in the accompanying drawings. For example, two consecutively represented boxes can actually be executed substantially in parallel, and they can sometimes be executed in reverse order, depending on the function involved. It should also be noted that each box in a block diagram or flowchart, and combinations of boxes in a block diagram or flowchart, may be implemented with a dedicated hardware-based system that performs the specified function or operation, or may be implemented with a combination of dedicated hardware and computer instructions.

The units described as being involved in embodiments of the present disclosure may be implemented by means of software or may be implemented by means of hardware, and the described units may also be provided in a processor. The names of the units do not constitute a limitation of the unit itself in a certain case.

As another aspect, the present disclosure also provides a computer-readable medium, which may be contained in the halo test device described in the above embodiment; or it may stand alone and not be assembled into that halo test device. The computer-readable medium carries one or more programs which, when the one or more programs are executed by one such halo test device, cause the halo test device to implement the method in the above embodiment.

It should be noted that, although several modules or units of the device for action execution are mentioned in the detailed description above, this division is not mandatory. Indeed, according to embodiments of the present disclosure, the features and functions of two or more modules or units described above may be specified in a single module or unit. Conversely, the features and functions of one module or unit described above may be further divided to be specified by more than one module or unit.

By the above description of the embodiments, it is readily understood by those skilled in the art that the embodiments described herein can be implemented by means of software, or by means of software in combination with the necessary hardware. Thus, the technical solution according to the embodiments of the present disclosure may be embodied in the form of a software product that may be stored in a non-volatile storage medium (which may be a CD-ROM, a USB flash drive, a removable hard drive, etc.) or on a network, and that includes a number of instructions for causing a computing device (which may be a personal computer, a server, a touch terminal, or a network device, etc.) to perform the method according to the embodiments of the present disclosure.

Other embodiments of the present disclosure will readily come to mind to those skilled in the art upon consideration of the specification and practice of the invention disclosed herein. The present disclosure is intended to cover any variations, uses, or adaptations of the present disclosure that follow the general principles of the present disclosure and that include means of common knowledge or practice in the art not disclosed herein. The specification and embodiments are to be regarded as exemplary only, and the true scope and spirit of the present disclosure is indicated by the appended claims.

What is claimed is:

1. A halo test method, comprising:

selecting, by a processor, one or more to-be-tested regions defined within a display region of a to-be-tested display device, wherein the to-be-tested display device comprises the display region and a non-display region;

lighting up a target test region with a preset grey scale, wherein the target test region is one of the to-be-tested regions;

obtaining luminances where a plurality of unlit pixel points surrounding the target test region and within a preset range from the target test region are located;

based on a proportion relationship between the luminances where each of the plurality of unlit pixel points in a same direction of the target test region is located and a display luminance of the display region when the to-be-tested display device is lit up with the preset grey scale, obtaining, through calculation, normalized grey scales corresponding to the luminances where each unlit pixel point is located, wherein each unlit pixel point in the same direction of the target test region is located in the same side of the target test region and in the same straight line as a centre of the target test region;

based on a maximum normalized grey scale and a minimum normalized grey scale of the normalized grey scales corresponding to the luminances where each unlit pixel point in the same direction of the target test region is located, obtaining normalized grey scale difference information measured in the target test region; and obtaining a halo value of the to-be-tested display device based on a minimum grey scale difference in or an average value of the normalized grey scale difference information measured in the one or more to-be-tested regions.

2. The halo test method according to claim 1, wherein based on the maximum normalized grey scale and the minimum normalized grey scale of the normalized grey scales corresponding to the luminances where each unlit pixel point in the same direction of the target test region is located, obtaining the normalized grey scale difference information measured in the target test region comprises:

obtaining the maximum normalized grey scale and the minimum normalized grey scale in the normalized grey scales corresponding to the luminances where all unlit pixel points in the same direction of the target test region are located;

calculating a grey scale difference between the maximum normalized grey scale and the minimum normalized grey scale; and based on the grey scale difference, obtaining the normalized grey scale difference information measured in the target test region.

3. The halo test method according to claim 2, wherein the obtaining the halo value of the to-be-tested display device based on the minimum grey scale difference in or an average value of the normalized grey scale difference information measured in the one or more to-be-tested regions comprises:

obtaining the minimum grey scale difference in all normalized grey scale difference information measured in the one or more to-be-tested regions; and taking the minimum grey scale difference as the halo value of the to-be-tested display device.

4. The halo test method according to claim 2, wherein based on the proportion relationship between the luminances where each of the plurality of unlit pixel points in the same direction of the target test region is located and the display luminance of the display region when the to-be-tested display device is lit up with the preset grey scale, obtaining, through calculation, the normalized grey scales corresponding to the luminances where each unlit pixel point is located, wherein each unlit pixel point in the same direction of the target test region is located in the same side of the target test region and in the same straight line as the centre of the target test region, comprises:

based on the luminances where each of the plurality of unlit pixel points in a first direction of the target test region is located and the display luminance of the display region when the to-be-tested display device is lit up with the preset grey scale, obtaining the normalized grey scales corresponding to the luminances where each unlit pixel point in the first direction of the target test region is located;

based on the luminances where each of the plurality of unlit pixel points in a second direction of the target test region is located and the display luminance of the display region when the to-be-tested display device is lit up with the preset grey scale, obtaining the normalized grey scales corresponding to the luminances where each unlit pixel point in the second direction of the target test region is located;

based on the luminances where each of the plurality of unlit pixel points in a third direction of the target test region is located and the display luminance of the display region when the to-be-tested display device is lit up with the preset grey scale, obtaining the normalized grey scales corresponding to the luminances where each unlit pixel point in the third direction of the target test region is located;

based on the luminances where each of the plurality of unlit pixel points in a fourth direction of the target test region is located and the display luminance of the display region when the to-be-tested display device is lit up with the preset grey scale, obtaining the normalized grey scales corresponding to the luminances where each unlit pixel point in the fourth direction of the target test region is located;

wherein the first direction is opposite to the second direction, the third direction is opposite to the fourth direction, and the first direction and the second direction are perpendicular to the third direction and the fourth direction; and wherein the based on the grey scale difference, obtaining normalized grey scale difference information measured in the target test region, comprises:

taking the minimum grey scale difference in all grey scale differences corresponding to the first direction, the second direction, the third direction and the fourth direction as the normalized grey scale difference information measured in the target test region.

5. The halo test method according to claim 1, wherein based on the proportion relationship between the luminances where each of the plurality of unlit pixel points in the same direction of the target test region is located and the display luminance of the display region when the to-be-tested display device is lit up with the preset grey scale, obtaining, through calculation, the normalized grey scales corresponding to the luminances where each unlit pixel point is located, wherein each unlit pixel point in the same direction of the target test region is located in the same side of the target test region and in the same straight line as the centre of the target test region, comprises:

obtaining the normalized grey scales corresponding to the luminances where each unlit pixel point is located, based on a mapping relationship $$S = 255 \times \left(\frac{L_{dot_i}}{L_{255}}\right)^{\left(\frac{1}{2.2}\right)},$$

i=1, 2, . . . M;

wherein S represents the normalized grey scale corresponding to the luminance where the unlit pixel point is located, $L_{dot_i}$ represents luminance where an $i_{th}$ unlit pixel point in the same direction of the target test region is located, M represents a number of the unlit pixel point within the preset rang from the target test region, and $L_{255}$ represents the display luminance of the display region when the to-be-tested display device is lit up with the preset grey scale.

6. The halo test method according to claim 4, wherein the display luminance of the display region when the to-be-tested display device is lit up with the preset grey scale is display luminance at a centre of the display region when the to-be-tested display device is lit up with the preset grey scale; and wherein the selecting one or more to-be-tested regions from the display region of the to-be-tested display device comprises:

selecting one or more to-be-tested regions, whose centre coincides with a centre of the display region, from the display region of the to-be-tested display device.

7. The halo test method according to claim 1, wherein when a plurality of to-be-tested regions are selected, the plurality of to-be-tested regions comprise at least one to-be-tested region corresponding to an integer multiple of backlight partitions and at least one to-be-tested region corresponding to a non-integer multiple of the backlight partitions.

8. The halo test method according to claim 1, wherein the preset grey scale is 255 grey scales, and when the target test region is lit up with the preset grey scale, a non-target test region in the display region other than the target test region is set to 0 grey scale.

9. The halo test method according to claim 1, wherein the preset range is 200 pixel points.

10. The halo test method according to claim 1, wherein a plurality of to-be-tested regions are selected, and the plurality of to-be-tested regions overlap with each other or are completely independent of each other.

11. The halo test method according to claim 1, wherein the obtaining luminances where the plurality of unlit pixel points within the preset range from the target test region are located refer to obtaining the luminances where all the unlit pixel points within the preset range from the target test region are located, or obtaining the luminances where a portion of the unlit pixel points within the preset range from the target test region are located, where the portion of the unlit pixel points need to at least include the unlit pixel points nearest to the target test region and the unlit pixel points whose distance from the target test region is equal to the preset range, in the same direction of the target test region.

12. The halo test method according to claim 1, wherein the obtaining normalized grey scale difference information measured in the target test region refers to obtaining the normalized grey scales corresponding to the luminances where all unlit pixel points within the preset range from the target test region and in the same direction of the target test region are located, or obtaining the normalized grey scales corresponding to the luminances where a portion of the unlit pixel points within the preset range from the target test region and in the same direction of the target test region are located, wherein the portion of the unlit pixel points must at least include the unlit pixel point nearest to the target test region and the unlit pixel point whose distance from the target test region is equal to the preset range.

13. The halo test method according to claim 2, wherein the calculating the grey scale difference between the maximum normalized grey scale and the minimum normalized grey scale comprises:

calculating the grey scale difference between the maximum normalized grey scale and the minimum normalized grey scale based on a mapping relationship $\Delta S_{direction}=S_{max}-S_{min}$;

wherein $\Delta S_{direction}$ represents the grey scale difference corresponding to a certain direction, $S_{max}$ represents the maximum normalized grey scale in the normalized grey scales corresponding to the luminances where each unlit pixel point in a certain direction of the target test region is located, $S_{min}$ represents the minimum normalized grey scale in the normalized grey scales corresponding to the luminances where each unlit pixel point in a certain direction of the target test region is located.

14. The halo test method according to claim 1, wherein the first direction, the centre of the target test region, and the second direction are located on the same straight line, which is a diagonal line of the target test region, and the third direction, the centre of the target test region, and the fourth direction are located on the same straight line, which is another diagonal line of the target test region.

15. The halo test method according to claim 4, wherein the first direction and the second direction are located on two parallel straight lines, respectively, and the third direction and the fourth direction are located on two parallel straight lines, respectively.

16. A halo test device, comprising:

one or more processors; and memory for storing one or more computer programs;

wherein when the one or more computer programs are executed by the one or more processors, the one or more processors implement a halo test method;

wherein the method comprises:

selecting one or more to-be-tested regions defined within a display region of a to-be-tested display device, wherein the to-be-tested display device comprises the display region and a non-display region;

lighting up a target test region with a preset grey scale, wherein the target test region is one of the to-be-tested regions;

obtaining luminances where a plurality of unlit pixel points surrounding the target test region and within a preset range from the target test region are located;

based on a proportion relationship between the luminances where each of the plurality of unlit pixel points in a same direction of the target test region is located and a display luminance of the display region when the to-be-tested display device is lit up with the preset grey scale, obtaining, through calculation, normalized grey scales corresponding to the luminances where each unlit pixel point is located, wherein each unlit pixel point in the same direction of the target test region is located in the same side of the target test region and in the same straight line as an centre of the target test region;

based on a maximum normalized grey scale and a minimum normalized grey scale of the normalized grey scales corresponding to the luminances where each unlit pixel point in the same direction of the target test region is located, obtaining normalized grey scale difference information measured in the target test region; and obtaining a halo value of the to-be-tested display device based on a minimum grey scale difference in or an average value of the normalized grey scale difference information measured in the one or more to-be-tested regions.

17. The halo test device according to claim 16, wherein based on the maximum normalized grey scale and the minimum normalized grey scale of the normalized grey scales corresponding to the luminances where each unlit pixel point in the same direction of the target test region is located, obtaining the normalized grey scale difference information measured in the target test region comprises:

obtaining the maximum normalized grey scale and the minimum normalized grey scale in the normalized grey scales corresponding to the luminances where all unlit pixel points in the same direction of the target test region are located;

calculating a grey scale difference between the maximum normalized grey scale and the minimum normalized grey scale; and based on the grey scale difference, obtaining the normalized grey scale difference information measured in the target test region.

18. The halo test device according to claim 17, wherein the obtaining the halo value of the to-be-tested display device based on the minimum grey scale difference in or an average value of the normalized grey scale difference information measured in the one or more to-be-tested regions comprises:

obtaining the minimum grey scale difference in all normalized grey scale difference information measured in the one or more to-be-tested regions; and taking the minimum grey scale difference as the halo value of the to-be-tested display device.

19. The halo test device according to claim 17, wherein based on the proportion relationship between the luminances where each of the plurality of unlit pixel points in the same direction of the target test region is located and the display luminance of the display region when the to-be-tested display device is lit up with the preset grey scale, obtaining, through calculation, the normalized grey scales corresponding to the luminances where each unlit pixel point is located, wherein each unlit pixel point in the same direction of the target test region is located in the same side of the target test region and in the same straight line as the centre of the target test region, comprises:

based on the luminances where each of the plurality of unlit pixel points in a first direction of the target test region is located and the display luminance of the display region when the to-be-tested display device is lit up with the preset grey scale, obtaining the normalized grey scales corresponding to the luminances where each unlit pixel point in the first direction of the target test region is located;

based on the luminances where each of the plurality of unlit pixel points in a second direction of the target test region is located and the display luminance of the display region when the to-be-tested display device is lit up with the preset grey scale, obtaining the normalized grey scales corresponding to the luminances where each unlit pixel point in the second direction of the target test region is located;

based on the luminances where each of the plurality of unlit pixel points in a third direction of the target test region is located and the display luminance of the display region when the to-be-tested display device is lit up with the preset grey scale, obtaining the normalized grey scales corresponding to the luminances where each unlit pixel point in the third direction of the target test region is located;

based on the luminances where each of the plurality of unlit pixel points in a fourth direction of the target test region is located and the display luminance of the display region when the to-be-tested display device is lit up with the preset grey scale, obtaining the normalized grey scales corresponding to the luminances where each unlit pixel point in the fourth direction of the target test region is located;

wherein the first direction is opposite to the second direction, the third direction is opposite to the fourth direction, and the first direction and the second direction are perpendicular to the third direction and the fourth direction; and wherein the based on the grey scale difference, obtaining normalized grey scale difference information measured in the target test region, comprises:

taking the minimum grey scale difference in all grey scale differences corresponding to the first direction, the second direction, the third direction and the fourth direction as the normalized grey scale difference information measured in the target test region.

* * * * *